Feb. 3, 1942.  R. H. BROCKMAN  2,271,934
MANDREL
Filed Feb. 2, 1940
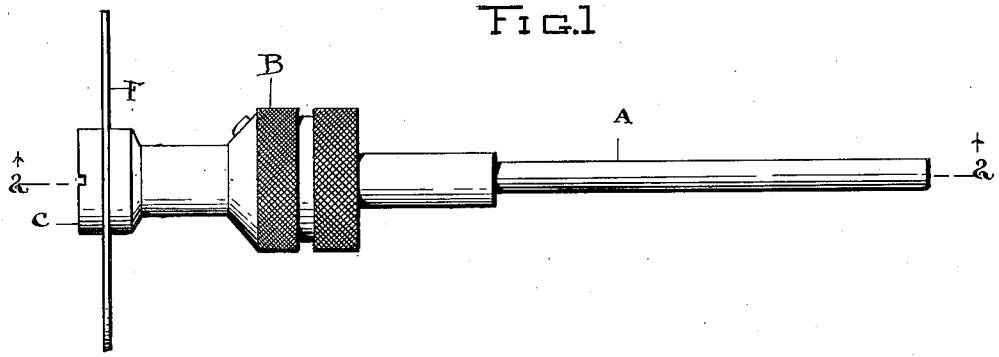
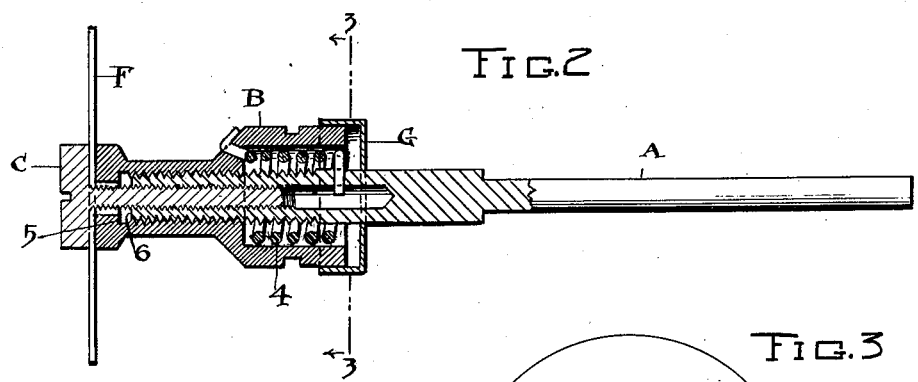
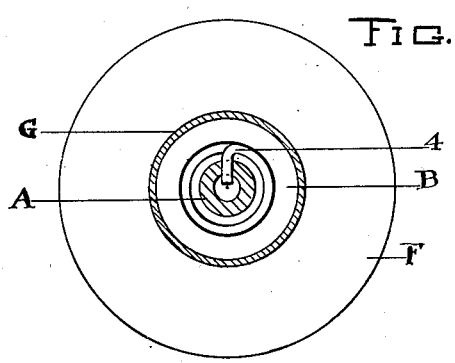
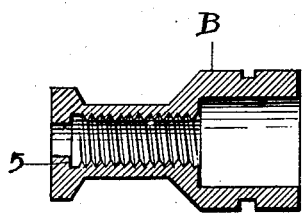
INVENTOR
ROBERT H. BROCKMAN
BY Edward M. Fisher
ATTORNEY Patented Feb. 3, 1942

2,271,934

UNITED STATES PATENT OFFICE 2,271,934

MANDREL

Robert H. Brockman, St. Petersburg, Fla.

Application February 2, 1940, Serial No. 316,976

5 Claims. (Cl. 32—59)

This invention is concerned with the provision of a mandrel for flat discs by means of which disc and mandrel may be rotated in either a clockwise or counter-clockwise direction without the disc becoming loose, thereby avoiding otherwise necessary changing of tools.

Broadly it is an object of my invention to provide a mandrel having an arbor adapted to be fitted in a standard chuck or dental hand piece, means to mount a flat disc upon one end of said mandrel and means in conjunction with said disc and arbor whereby said mandrel and disc may be rotated in either a clockwise or counter-clockwise direction without the disc becoming loose, thereby avoiding the necessity of any adjustments or changing of mandrels when it is desired to reverse the direction of rotation of the disc.

This invention resides substantially in the combination, construction, arrangement and relative location of parts, all in accordance with the disclosure herein.

In the accompanying drawing,

Figure 1 is a side elevational view, with dust cap removed, of a device in accordance with the invention.

Figure 2 is a sectional view on line 2—2, Figure 1.

Figure 3 is a sectional view on line 3—3, Figure 2.

Figure 4 is a sectional detail view of the sleeve portion of my invention.

The true nature and manner of use of a device in accordance with this invention will best be understood by a detailed description of the form thereof shown in the drawing in an illustrative sense.

The device includes an arbor A which is preferably, as shown, cylindrical in form and of suitable diameter for engagement with a conventional chuck or dental hand piece. Inner end of said arbor member is threaded both internally and externally, the outer thread being relatively coarser than the internal thread.

Upon the outer threaded portion of said arbor is mounted a sleeve member B which is internally threaded to conform to and engage with the outer thread on the said arbor and adapted to be rotated thereon within thread limits.

On reference to the drawing it will be seen that the inner portion of said sleeve B is enlarged and recessed thereby forming a housing for a coil spring 4 which encircles the inner end portion of said arbor member, one end of said spring being attached to said arbor, the other end to said sleeve. Threaded to conform with the internal thread of said arbor member and of suitable size for engagement therewith is a screw member C said member having a relatively flat head. In the assembly of the mandrel as illustrated in the drawing said screw member C is inserted through a disc as indicated by F and then screwed into the internal threaded portion of the arbor A bringing said disc into contact with sleeve member B then in the use of the mandrel, as the disc is rotated, the screw is slightly turned bringing the disc into frictional contact with sleeve B causing same to turn thereby bringing the spring 4 under a torsional strain until the shoulder 5 of sleeve B is contacted with end portion 6 of arbor A. The device is now locked the same as if there was a direct screw and shoulder contact and the disc is tightly held during a clockwise rotation of the mandrel, now if the direction of the rotation is reversed the screw C tends to unscrew but as it does the frictional contact of the sleeve B with the disc F and the torsion of the spring 4 causes the sleeve B to gain on the screw C due to difference in the pitch of the two threads which for the sake of illustration I will say is 56 t. p. i. and 44 t. p. i., internally and externally respectively of said arbor and direct contacting members, the difference in pitch will give a very fine pitch thereby causing an intense pressure or locking of the threads in their respective counter parts resulting in the disc being held tightly and any tendency of the screw C to loosen is instantly more than compensated for by the sleeve B.

To unlock or loosen the device all that is necessary is to hold the disc F and give the sleeve B a slight turn.

To prevent accumulation of dust or dirt within the internal portion of my device a dust cap G is provided as shown in Figure 2.

From the above description it is apparent to those skilled in the art that the details of construction illustrated therein may readily be varied without departure from the novel disclosure. I do not, therefore, desire to be restricted by the disclosure but rather by the claims granted me.

What I claim:

1. A mandrel of the character described having, in combination, an arbor one end of which is adapted to engage a chuck the opposite end being threaded internally and externally with a relatively fine and coarse thread respectively, a sleeve, a portion of which forms a housing, internally threaded to conform to the outer threaded portion of said arbor and engageable thereon, a spring in said housing and having its ends respectively attached to said arbor and sleeve and a screw member adapted to support a tool and of suitable size and having a conforming thread to permit screw engagement with the internal thread of said arbor.

2. In a mandrel of the character described, the combination of an arbor one end of which is suitable to engage a chuck the opposite end being threaded internally and externally, a sleeve, portion of which forms housing, suitably internally threaded to engage the external thread of said arbor, a coil spring within said housing portion of said sleeve, coiled upon said arbor and having its ends attached to said arbor and sleeve respectively, and a screw member, adapted to support a tool, of suitable size and thread to engage the internal thread of said arbor.

3. In a mandrel of the character described having, in combination an arbor one end of which is suitable to engage a chuck, the opposite end threaded internally and externally, a sleeve portion suitably internally threaded to engage the external threaded portion of said arbor, the inner portion of said sleeve being enlarged and recessed to form a housing for a spring which encircles the inner portion of said arbor, one end of the spring being attached to the arbor and the other end to said sleeve, and a screw member adapted to support a tool and of suitable size and thread to engage the internal thread of said arbor.

4. In a mandrel of the character described having, in combination, an arbor one end of which is suitable to engage a chuck the other end being threaded externally and internally, a sleeve portion suitably internally threaded and mounted on said arbor, said sleeve having an internal shoulder adapted to contact the threaded end of said arbor to develop frictional relation between said sleeve and arbor and create a torsion within a spring housed within said sleeve, one end of the spring being attached to said arbor and the other end attached to said sleeve, and a screw member adapted to support a tool and of suitable size and thread to engage the internal thread of said arbor.

5. In a mandrel of the character described, having in combination an arbor the outer end of which is suitable for engagement with a chuck the opposite end threaded internally and externally, a sleeve, the outer portion of which forms a housing the outer end of said housing being exposed, and suitably formed for engagement upon the external portion of said arbor, said sleeve having an internal shoulder to contact the threaded end portion of said arbor to develope frictional contact therewith and create a torsion within a spring housed within said sleeve, one end of the spring being attached to said arbor and the other end to said sleeve, a cap engaged upon the exposed housing end of said sleeve to prevent foreign matter from entering said housing and a screw member adapted to support a tool and of suitable size and thread to engage the internal threaded portion of said arbor.

ROBERT H. BROCKMAN.